United States Patent
Lin et al.

(10) Patent No.: US 8,363,968 B2
(45) Date of Patent: Jan. 29, 2013

(54) IMAGE CODING METHOD FOR FACILITATING RUN LENGTH CODING AND IMAGE ENCODING DEVICE THEREOF

(75) Inventors: Yu-Cheng Lin, Hsinchu Hsien (TW); Ying-Chieh Tu, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 181 days.

(21) Appl. No.: 13/018,052

(22) Filed: Jan. 31, 2011

(65) Prior Publication Data

US 2011/0317933 A1    Dec. 29, 2011

(30) Foreign Application Priority Data

Jun. 24, 2010 (TW) ................................. 99120588 A

(51) Int. Cl.
*G06K 9/36* (2006.01)
*G06K 9/46* (2006.01)

(52) U.S. Cl. ...................... 382/245; 382/251

(58) Field of Classification Search ............ 382/170, 382/232, 233, 245, 250, 251, 254; 348/403, 348/405, 432, 433; 341/143

See application file for complete search history.

(56) References Cited

U.S. PATENT DOCUMENTS

| | | | | | |
|---|---|---|---|---|---|
| 5,353,026 | A | * | 10/1994 | Wilson | 341/143 |
| 6,023,531 | A | * | 2/2000 | Peters | 382/232 |
| 6,633,679 | B1 | * | 10/2003 | Yfantis | 382/240 |
| 7,444,030 | B2 | * | 10/2008 | Reid et al. | 382/239 |
| 7,822,281 | B2 | * | 10/2010 | Becker et al. | 382/239 |
| 2011/0317933 | A1 | * | 12/2011 | Lin et al. | 382/251 |

* cited by examiner

*Primary Examiner* — Amir Alavi

(74) *Attorney, Agent, or Firm* — Andy M. Han; Han IP Law PLLC

(57) ABSTRACT

An image coding method for run-length coding (RLC), including quantizing a coefficient string representing a plurality of pixel values to generate a first quantization coefficient string, determining a cutoff quantization coefficient in the first quantization coefficient string, discarding a part of quantization coefficients of the first quantization coefficient string according to the cutoff quantization coefficient, and forming remaining quantization coefficients of the first quantization coefficient string as a second quantization coefficient string, and performing image coding to the second quantization coefficient string with the RLC.

20 Claims, 3 Drawing Sheets

200

| 0 | 1 | 2 | 3 | 4 | 5 | 6 | 7 |
|---|---|---|---|---|---|---|---|
| 0 | 0 | 8 | 0 | 0 | 0 | 0 | 3 |
| 8 | 9 | 10 | 11 | 12 | 13 | 14 | 15 |
| 0 | 0 | 6 | 0 | 0 | 0 | 0 | 5 |
| 16 | 17 | 18 | 19 | 20 | 21 | 22 | 23 |
| 0 | 0 | 0 | 3 | 0 | 0 | 0 | 0 |
| 24 | 25 | 26 | 27 | 28 | 29 | 30 | 31 |
| 0 | 0 | 0 | 0 | 0 | 3 | 0 | 0 |
| 32 | 33 | 34 | 35 | 36 | 37 | 38 | 39 |
| 0 | 0 | 0 | 0 | 1 | 0 | 0 | 0 |
| 40 | 41 | 42 | 43 | 44 | 45 | 46 | 47 |
| 5 | 0 | 0 | 9 | 0 | 0 | 0 | 0 |
| 48 | 49 | 50 | 51 | 52 | 53 | 54 | 55 |
| 0 | 0 | 0 | 0 | 0 | 0 | 0 | 0 |
| 56 | 57 | 58 | 59 | 60 | 61 | 62 | 63 |
| 0 | 0 | 0 | 0 | 0 | 0 | 0 | 0 |

FIG.2

IMAGE CODING METHOD FOR FACILITATING RUN LENGTH CODING AND IMAGE ENCODING DEVICE THEREOF

CROSS REFERENCE TO RELATED PATENT APPLICATIONS

This patent application claims priority from Taiwan Patent Application No. 099120588, filed in the Taiwan Patent Office on Jun. 24, 2010, and incorporates the Taiwan patent application in its entirety by reference.

TECHNICAL FIELD

The present disclosure relates to an image coding method and related image coding device, and more particularly, to an image coding method and related image coding device for facilitating run-length coding (RLC).

BACKGROUND OF THE PRESENT DISCLOSURE

A common image coding procedure mainly comprises processes of digital signal transform and quantization. The digital signal transform is performed in a unit of image blocks comprising a plurality of pixels, and selectively conforms to common protocols, e.g., Joint Photographic Experts Group (JPEG), Motion Picture Experts Group (MPEG) 2, MPEG 4 and H.264. The quantization is performed after the digital signal transform to scale down the number of pixels of the image block, so as to reduce a number of bits for representing a single pixel number, and thereby reducing a data amount for representing a single block. By performing the quantization on each of the image blocks, the image block can be divided into different levels. Since the image blocks undergoing the digital signal transform and the quantization generally comprise a large amount of zero quantization coefficients (each of the quantization coefficients corresponds to a single pixel), additional bit numbers are needed for storing the zero quantization coefficients, which is extremely unfavorable for processing the image encoding to a large amount of blocks.

Therefore, an encoding program called run-length coding (RLC) is applied to encode such blocks comprising a large amount of the zero quantization coefficients, so as to reduce the number of bits and the data amount for storing a single block. Basic principles of the RLC are depicted herein with a binary bitstream. Assume a binary bitstream of "00001100", it is converted to "402120" with the RLC to represent three RLC strings comprising four successive bits of "0", two successive bits of "1" and two successive bits of "0". With principles similar to the above, the image coding utilizing the RLC is capable of reducing the number of bits or the data amount for storing each of the image blocks.

However, the image coding utilizing the RLC also has disadvantages. First, after undergoing the digital signal processing and the quantization, a plurality of quantization coefficients of a single block needs to be linearly scanned one by one for performing the RLC. However, when a plurality of successive zero-runs RLC strings and a plurality of successive nonzero-runs RLC strings are generated during a scanning process for performing RLC on the plurality of quantization coefficients of a single image block, the linearly scanning is rather time-consuming. In addition, when a position of a last non-zero quantization coefficient of a single block is confirmed, it is unnecessary to scan the remainder of zero quantization coefficients for the sake of reducing processing time and increasing efficiency.

SUMMARY OF THE PRESENT DISCLOSURE

According to an embodiment of the present disclosure, an image coding method for run length coding (RLC) comprises quantizing a coefficient string representing a plurality of pixel values to generate a first quantization coefficient string, determining a cutoff quantization coefficient in the first quantization coefficient string, discarding a part of quantization coefficients of the first quantization coefficient string according to the cutoff quantization coefficient, and forming remaining quantization coefficients of the first quantization coefficient string as a second quantization coefficient string, and performing image coding to the second quantization coefficient string with the RLC.

According to another embodiment of the present disclosure, an image coding method for run length coding (RLC) comprises quantizing a coefficient string representing a plurality of pixel values to generate a first quantization coefficient string, and selecting a plurality of quantization coefficients in the first quantization coefficient string, and performing image coding on the plurality of quantization coefficients to generate an RLC string.

According to yet another embodiment of the present disclosure, an image coding apparatus for run length coding (RLC) comprises a quantization module, for quantizing a coefficient string representing a plurality of pixels to generate a first quantization coefficient string, a coefficient memory, for temporarily storing the first quantization coefficient string, an image block information register, for temporarily storing a cutoff quantization coefficient, an RLC engine, for discarding a part of the quantization coefficients of the first quantization coefficient string according to the cutoff quantization coefficient to form a second quantization coefficient string, and run-length coding the second quantization coefficient string.

BRIEF DESCRIPTION OF THE DRAWINGS

FIG. 2 is a schematic diagram of an 8×8 image block 200, for illustrating the method for facilitating RLC, wherein the 8×8 image block comprises 64 quantization coefficients.

DETAILED DESCRIPTION OF THE PREFERRED EMBODIMENT

In order to avoid consumption of excessive or unnecessary scanning time for encoding a plurality of quantization coefficients comprised in a single image block via the RLC in the prior art, the present disclosure discloses an image coding method and the related image coding device for facilitating the RLC. In the present disclosure, coding of an image block is accelerated significantly by simultaneously scanning and encoding a plurality of quantization coefficients of a single image block. In addition, the remaining non-zero quantization coefficients of a single image block can be rapidly analyzed without deteriorating much accuracy by defining a cutoff quantization coefficient, so as to avoid consumption of unnecessary scanning time for scanning unnecessary zero quantization coefficients.

Figure 1:
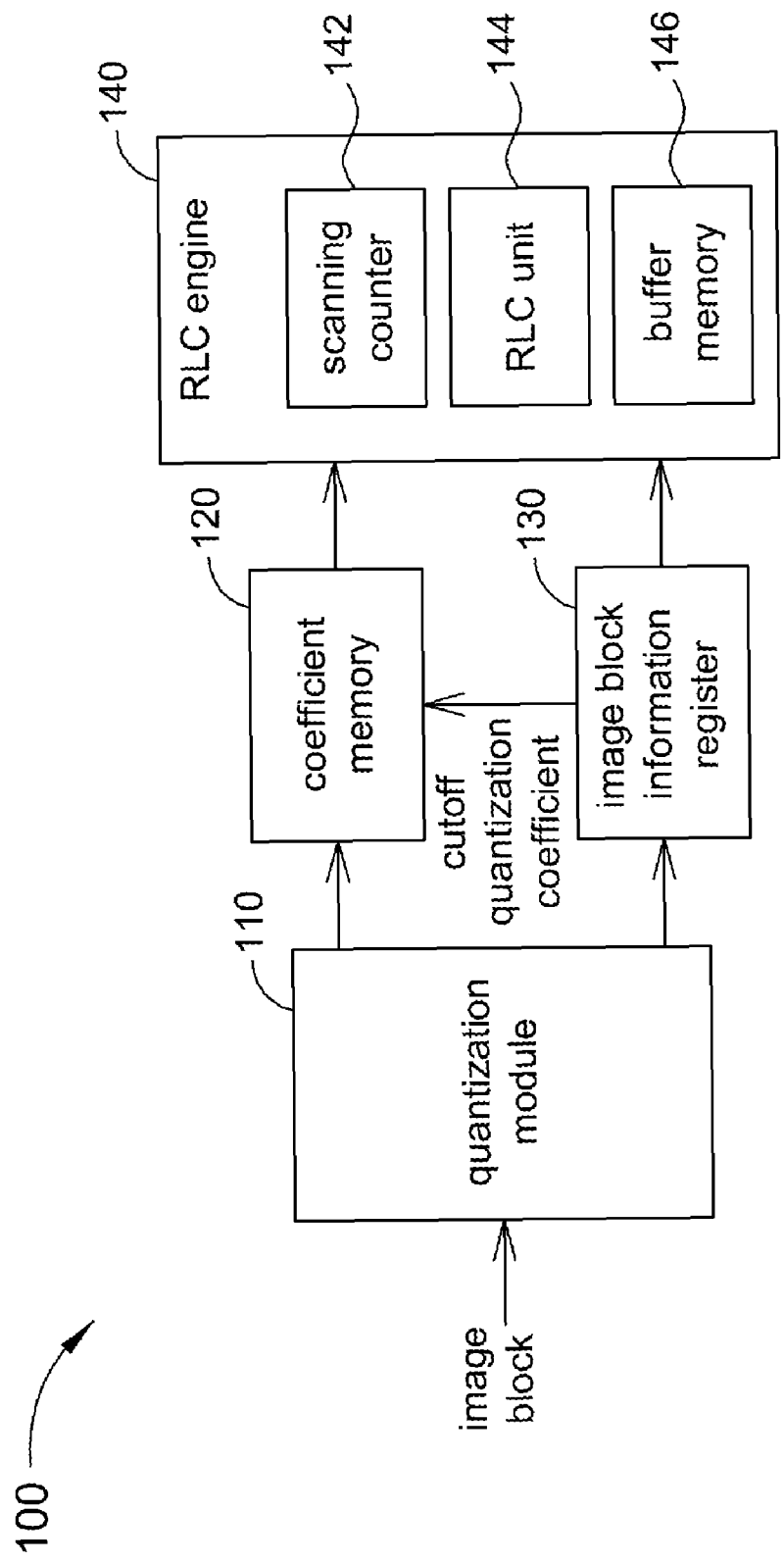
FIG. 1 is a schematic diagram of an image coding apparatus 100 according to an embodiment of the present disclosure.

FIG. 1 is a schematic diagram of an image coding apparatus 100 according to an embodiment of the present disclosure. The image coding apparatus 100 comprises a quantization module 110, a coefficient memory 120, an image block information register 130, and an RLC engine 140. The quantization module 110 is utilized for receiving image blocks, each comprising a plurality of pixels, wherein the plurality of pixels can be regarded as a coefficient string. The quantization module 110 is also utilized for quantizing a plurality of pixels of each image block to a plurality of quantization coefficients, wherein the plurality of quantization coefficients can be regarded as a quantization coefficient string. The coefficient memory 120 is utilized for temporarily storing the plurality of quantization coefficients of each image block generated by the quantization module 110. The image block information register 130 is utilized for storing a cutoff quantization coefficient for determining a degree for scanning the plurality of quantization coefficients of each image block. The RLC engine 140 is utilized for performing a run length encoding to the plurality of quantization coefficients according to the plurality of quantization coefficients stored in the coefficient memory 120 and the cutoff quantization coefficients stored in the image block information register 130, so as to generate an RLC string.

The RLC engine 140 comprises a scanning counter 142 and an RLC unit 144. When RLC engine 140 reads a plurality of quantization coefficients of a single image block from the coefficient memory 120, the scanning counter 142 counts the quantity of quantization coefficients already read, hereinafter the read quantization coefficients. The RLC unit 144 determines RLC substrings contained in the read quantization coefficients. For example, in the process of RLC for the above binary bitstream "00001100", the RLC unit 144 identifies bit substrings "0000", "11" and "00" of the binary bitstream "00001100" according to features of the RLC, so as to generate three RLC substrings "40", "21" and "20". Please note that the RLC engine 140 further comprises a buffer memory 146, for temporarily storing a part of the read quantization coefficients.

The method for facilitating RLC provided by the present disclosure is implemented by the image coding apparatus 100 in FIG. 1, and is described as follows. FIG. 2 is a schematic diagram of an 8×8 image block 200, for illustrating the method for facilitating RLC, wherein the 8×8 image block comprises 64 quantization coefficients. Please note that the 64 quantization coefficients in the image block 200 are generated by the quantization module 110 from quantizing a coefficient string comprising 64 coefficients. The digit at the upper-left corner of each field is the number of each quantization coefficient, and the main digit of each field is the value of the quantization coefficient. When the RLC engine 140 reads the plurality of quantization coefficients in the image block 200 from the coefficient memory 120, the quantity of the read quantization coefficients of the image block 200 is counted, i.e. the number of each quantization coefficients. Please note that the number of each quantization coefficients listed in FIG. 2 is merely an example of a sequence of reading the quantization coefficients, in practice, the sequence of reading the quantization coefficients may have other modifications or variations. As shown in FIG. 2, supposing that the image block 200 is temporarily stored in the coefficient memory 120 in FIG. 1, and the sequence of reading the image block 200 is from left to right, from top to bottom, and row by row. In other words, the 64 quantization coefficients in FIG. 2 are read row by row in a sequence of a plurality of quantization coefficient substrings "00800003", "00600005", . . . , "00000000". Please note that the plurality of quantization coefficients among each quantization coefficient substrings are read with a synchronization approach in this embodiment. Take FIG. 2 as an example, when the quantization coefficient substring "00800003" is read, "0", "0", "8", "0", "0", "0", "0" and "3", the eight quantization coefficients of number 0 to 7, are read simultaneously, rather than being read one by one as in the prior art. The synchronization approach for reading the plurality of quantization coefficients implemented in the coefficient memory 120 may comprise disposing a plurality of parallel logical units in the coefficient memory 120, and appropriately modifying the arrangement of the quantization coefficients of the coefficient memory 120 in response to the synchronization approach. Please note that the implementation of the structure for reading a full row of quantization coefficients at one time in FIG. 2 can also be achieved with help of the scanning counter 142. For example, in FIG. 2, when the quantity of the read quantization coefficients is a multiple of 8, the RLC engine 140 can accurately read eight quantization coefficients at one time with the counting of the scanning counter 142.

A cutoff quantization coefficient is predefined before the image block 200 in FIG. 2 performs the RLC. The cutoff quantization coefficient is adopted for allowing the RLC engine 140 to perform the RLC without reading all of the quantization coefficients. More specifically, the cutoff quantization coefficient is determined according to the numbers of the quantization coefficients of the image blocks in a preferred embodiment of the present disclosure. In FIG. 2, in the image block the eight quantization coefficients "0", "0", "8", "0", "0", "0", "0" and "3" of the first quantization coefficient substring are respectively of number from 0 to 7, and the numbering of quantization coefficients of other quantization coefficient substrings are deduced accordingly. Supposing that the numbering of the cutoff quantization coefficient is selected to be 40, representing that the selected cutoff quantization coefficient in FIG. 2 is the first quantization sub-coefficient "5" of the sixth quantization coefficient substring "50090000". According to an indication of the scanning counter 142, after reaching the quantization sub-coefficient corresponding to the selected cutoff quantization coefficient, the RLC engine 140 no longer scan or read the subsequent quantization sub-coefficients of the image block 200. Accordingly, a scanning amount of the RLC engine 140 can be reduced by a certain degree, and thereby reducing unnecessary scanning time or power consumption. Selection of the cutoff quantization coefficient is commonly implemented by a software setting. For example, the cutoff quantization coefficient can be directly written into the image block information register 130 via the software setting, or when the quantization module 110 quantizes a plurality of pixels into a plurality of quantization coefficients, a final non-zero quantization coefficient (e.g., the quantized coefficient of number 43 in FIG. 2) is regarded as the cutoff quantization coefficient and is written into the image block information register 130 for encoding of the RLC engine 140.

Later depicted the method for facilitating the RLC with an approach of reading the image block 200 in FIG. 2, wherein the cutoff quantization coefficient is defined as a quantization coefficient "5" of number 40 among the plurality of quantization coefficients. The RLC engine 140 reads eight quantization sub-coefficients "00800003" in the first quantization sub-coefficient, and obtains a first RLC string "20184013" with the RLC. The RLC engine 140 then reads and encodes a second quantization coefficient substring "00600005" into a second RLC substring "20164015". When the RLC engine 140 reads a third quantization coefficient substring "00030000", since last four coefficients of the third quantization coefficient substring "00030000" are all zeros, the RLC engine 140 performs the run-length coding to the first four quantization coefficients "0003" of the third quantization coefficient substring "00030000" to obtain a third RLC substring "3013", and temporarily stores the last four un-encoded quantization coefficients "0000" into the buffer memory 146 or directly apply the last four un-encoded quantization coefficients "0000" to encode a fourth quantization coefficient substring "000000300" when there is no buffer memory 146. Therefore, when the RLC engine 140 performs run-length coding to the fourth quantization coefficient substring "00000300" subsequently, the last four quantization coefficients "0000" of the third quantization coefficient substring "00030000" are read from the buffer memory 146 or directly obtained when there is no buffer memory 146, and the four quantization coefficients "0000" are directly integrated with the fourth quantization coefficient substring "00000300" into an intermediate quantization coefficient substring "000000000300". Subsequently, the RLC engine 140 run-length codes the intermediate quantization coefficient substring "000000000300" into a fourth RLC sub-string "9013", with the last two un-encoded quantization coefficients "00" to be left behind; meanwhile, the last two un-encoded quantization coefficients "00" are also temporarily-stored in the buffer memory 146 or directly applied to encode a fifth quantization coefficient substring "00001000" when there is no buffer memory 146.

Likewise, when the fifth quantization coefficient substring "00001000" is run-length coded, the two un-encoded quantization coefficients "00" remained when the intermediate quantization coefficient substring "000000000300" is encoded are directly integrated with the fifth quantization coefficient substring "00001000" into another intermediate quantization coefficient substring "0000001000". The RLC engine 140 run-length codes the intermediate quantization coefficient substring "0000001000" to a fourth RLC sub-string "6011", and remains three un-encoded quantization coefficients "000". Meanwhile, the three un-encoded quantization coefficients "000" are also temporarily-stored into the buffer memory 146 or are directly applied to encode a sixth quantization coefficient substring "50090000" when there is no buffer memory 146. However, as mentioned above, since the quantization coefficient "5" of number 40, i.e., the first quantization coefficient "5" of the sixth quantization coefficient substring "50090000", is predefined as the cutoff quantization coefficient while encoding the image block 200, the scanning for encoding stops at the quantization coefficient "5". At the same time, the quantization coefficient "5" is integrated with the three quantization coefficients "000" remained when the fifth quantization coefficient substring "00001000" is encoded to generate another intermediate quantization coefficient substring "0005", which is encoded into a fifth RLC substring "3015". In conclusion, under the settings of the cutoff quantization coefficients mentioned above, an RLC string generated by run-length coding the image block 200 is "20184013201640153013901360113015", i.e., the combination of the above first to fifth RLC substrings.

Please note that under the settings of the cutoff quantization coefficient as the quantization coefficient "5" of number 40, although the substantial last non-zero coefficient of the image block 200 is the quantization coefficient "9" of number 43, the last non-zero coefficient encoded by the RLC engine 140 is the quantization coefficient "5" of number "40". In other words, in the RLC method provided by the present disclosure, the encoded last non-zero coefficient may not be the substantial last non-zero coefficient, whereby the scanning amount of scanning by the RLC engine 140 the image block 200 can be reduced. Therefore, balance of accuracy of the last non-zero coefficient and the scanning amount of the RLC engine 140 is determined according to selection of the cutoff quantization coefficient. When attempting to reduce the scanning amount of the RLC engine 140, the cutoff quantization coefficient is commonly selected as a quantization coefficient with a smaller number. For example, in the image block 200 in FIG. 2, the cutoff quantization coefficient can also selected as a quantization coefficient "0" of number 27. Accordingly, although accuracy brought by the subsequent quantization coefficient "3" of number 29, quantization coefficient "1" of number 36, quantization coefficient "5" of number 40 and quantization coefficient "9" of number 43 is sacrificed, load of the RLC engine 140 brought by the scanning amount is significantly reduced and speed of RLC is increased as well.

Please note that, conditions of numbers and a reading sequence of the quantization coefficients in FIG. 2 and the number of quantization coefficients comprised in the image block 200 are only applied to embodiments of the present disclosure. In other words, appropriate modifications of the foregoing conditions are within the spirit and scope of the present disclosure.

Furthermore, since a certain quantization coefficients (e.g., quantization coefficients of number 41 to 64 in the foregoing embodiments) are discarded, or otherwise abandoned, in the above-mentioned method utilizing the software setting to determine the cutoff quantization coefficient, those quantization coefficients to be discarded need not be generated at the beginning. More specifically, the quantization module 110 may determine pixels not to be quantized according to the cutoff quantization coefficient thereby achieving reduction of calculation amount of the quantization module 110. Moreover, the previous stage of the quantization module 110 in FIG. 1 may further comprise a digital signal transform (DST) unit (not shown in FIG. 1). In the situation that the cutoff quantization coefficient is set, the DST unit need not perform DST on all pixels, and further achieve reduction of the calculation amount of the DST unit.

Figure 3:
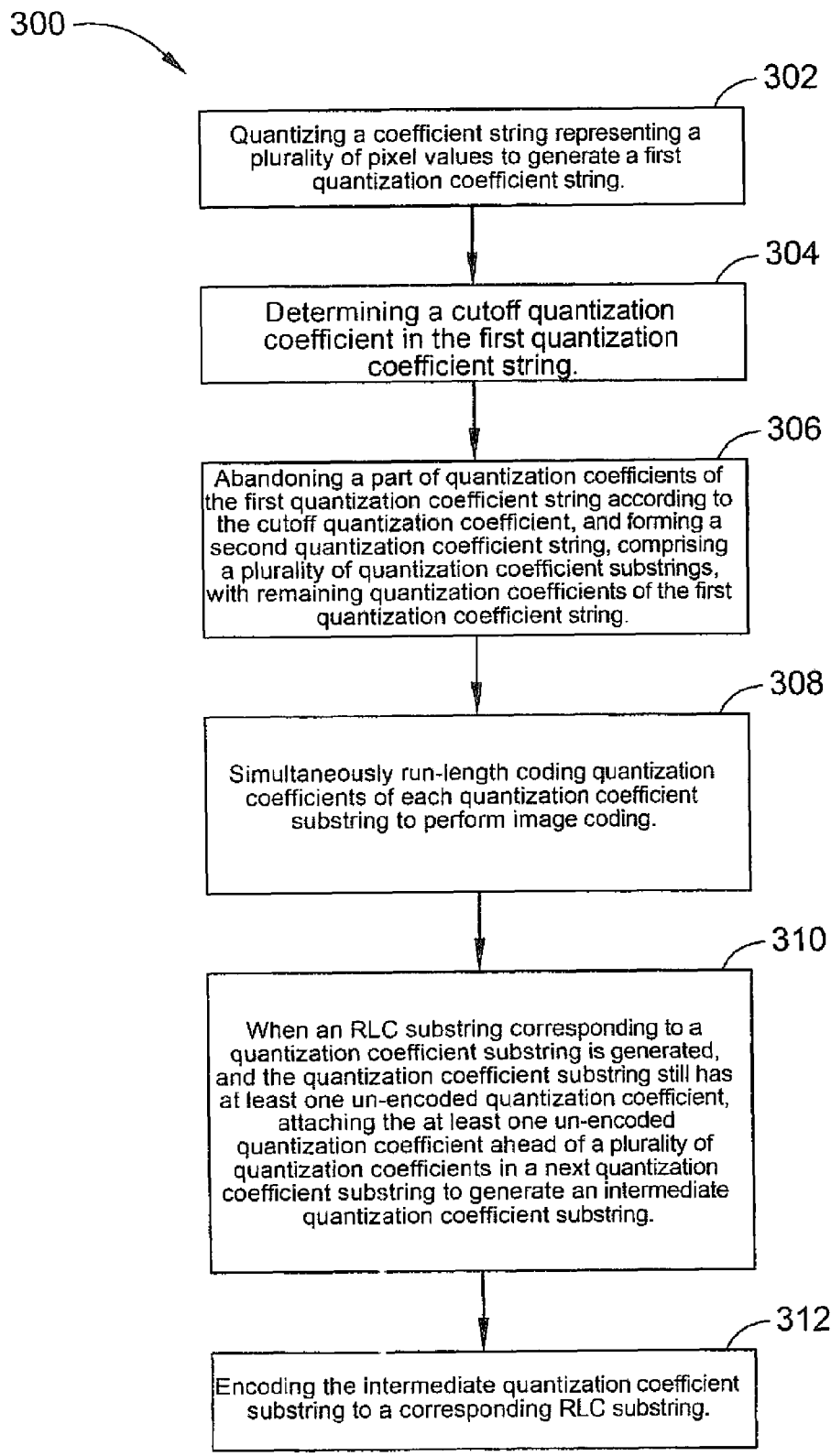
FIG. 3 is a flowchart of a method for facilitating RLC according to an embodiment of the present disclosure.

FIG. 3 is a flowchart of a method for facilitating RLC according to an embodiment of the present disclosure. As shown in FIG. 3, the method comprises following steps. In Step 302, quantizing a coefficient string representing a plurality of pixel values to generate a first quantization coefficient string. In Step 304, determining a cutoff quantization coefficient in the first quantization coefficient string. In Step 306, discarding a part of quantization coefficients of the first quantization coefficient string according to the cutoff quantization coefficient, and forming a second quantization coefficient string, comprising a plurality of quantization coefficient substrings, with remaining quantization coefficients of the first quantization coefficient string. In Step 308, simultaneously run-length coding quantization coefficients of each quantization coefficient substring to perform image coding. In Step 310, when an RLC substring corresponding to a quantization coefficient substring is generated, and the quantization coefficient substring still has at least one un-encoded quantization coefficient, attaching the at least one un-encoded quantization coefficient ahead of a plurality of quantization coefficients in a next quantization coefficient substring to generate an intermediate quantization coefficient substring. In Step 312, encoding the intermediate quantization coefficient substring to a corresponding RLC substring.

The method disclosed in FIG. 3 is a combination of methods disclosed in FIG. 1 and FIG. 2, and modifications of recombining and rearranging steps disclosed in FIG. 3 or replacing the steps with other descriptions of FIG. 1 or FIG. 2 are also within the scope of the present disclosure.

In conclusion, the present disclosure discloses an image coding method and related image coding device for facilitating run length coding (RLC). In the present disclosure, the problem in the prior art that RLC is rather time-consuming when quantization coefficients is scanned one by one can be solved; in addition, unnecessary scanning amount can be reduced by setting a cutoff quantization coefficient, and thereby facilitating the RLC.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image coding method for run-length coding (RLC), the method comprising:
   (a) quantizing a coefficient string representing a plurality of pixel values to generate a first quantization coefficient string;
   (b) determining a cutoff quantization coefficient in the first quantization coefficient string;
   (c) discarding a part of quantization coefficients of the first quantization coefficient string according to the cutoff quantization coefficient, and forming remaining quantization coefficients of the first quantization coefficient string as a second quantization coefficient string; and
   (d) performing image coding on the second quantization coefficient string with the RLC.

2. The method of claim 1, wherein the second quantization coefficient string comprises a plurality of quantization coefficient substrings having a plurality of quantization coefficients, and wherein Step (d) comprises:
   (d1) simultaneously run-length coding a plurality of quantization coefficients of each of the quantization coefficient substrings to generate an RLC substring corresponding to each of the quantization coefficient substrings;
   wherein an RLC string is formed from the plurality of RLC substrings generated from the plurality of quantization coefficient substrings.

3. The method of claim 2, wherein each of the RLC substrings comprises at least one coding coefficient.

4. The method of claim 2, wherein Step (d1) comprises:
   (g) when one RLC substring corresponding to one quantization coefficient substring is generated, and the quantization coefficient substring comprises at least one un-encoded quantization coefficient, temporarily storing the at least one un-encoded quantization coefficient; and
   (h) before generating a corresponding RLC substring from a next quantization coefficient, reading and attaching the at least one un-encoded quantization coefficient ahead of the quantization coefficients of the next quantization coefficient substring to generate an intermediate quantization substring, and encoding the intermediate quantization coefficient substring to generate a corresponding RLC substring;
   wherein a quantity of quantization coefficients of the intermediate quantization coefficient substring is larger than that of the quantization coefficients of each quantization coefficient substring.

5. The method of claim 2, wherein Step (d1) comprises:
   (j) when one RLC substring corresponding to one quantization coefficient substring is generated, and the quantization coefficient substring still comprises at least one un-encoded quantization coefficient, directly attaching the at least one un-encoded quantization coefficient ahead of quantization coefficients of the next quantization coefficient substring to generate an intermediate quantization coefficient substring, and encoding the intermediate quantization coefficient substring to a corresponding RLC substring;
   wherein a quantity of quantization coefficients of the intermediate quantization coefficient substring is larger than that of the quantization coefficients of each quantization coefficient substring.

6. The method of claim 1, wherein Step (b) comprises:
   determining the cutoff quantization coefficient according to a software setting.

7. The method as claimed in claim 6, wherein Step (a) comprises:
   determining the cutoff quantization coefficient according to the software setting; and
   discarding a part of the quantization coefficients of the coefficient string according to the cutoff quantization coefficient, and quantizing the coefficients that are not discarded.

8. An image coding method for run-length coding (RLC), the method comprising:
   (a) quantizing a coefficient string representing a plurality of pixel values to generate a first quantization coefficient string; and
   (b) selecting a plurality of quantization coefficients in the first quantization coefficient string, and performing image coding on the plurality of quantization coefficients to generate an RLC string.

9. The method of claim 8, wherein Step (a) comprises:
   determining a cutoff quantization coefficient in the first quantization coefficient string; and
   discarding a part of the quantization coefficients of the first quantization coefficient string according to the cutoff quantization coefficient, and forming remaining quantization coefficients of the first quantization coefficient string to the quantization coefficients in Step (b).

10. The method of claim 9, wherein determining a cutoff quantization coefficient in the first quantization coefficient string comprises:
    determining the cutoff quantization coefficient according to a software setting.

11. The method of claim 10, further comprising:
    (h) discarding a part of quantization coefficients of the first quantization coefficient string according to the cutoff quantization coefficient, and quantizing the coefficients that are not discarded.

12. The method of claim 8, wherein Step (b) comprises:
    (i) selecting a first quantization coefficient substring from quantization coefficient substrings of the first quantization coefficient string to simultaneously run-length code the plurality of quantization coefficients of the first quantization coefficient substring for image coding to generate a first RLC substring corresponding to the first quantization coefficient substring;
    (j) when the first RLC substring is generated, and the first quantization coefficient substring still comprises at least one un-encoded quantization coefficient, temporarily storing the at least one un-encoded quantization coefficient;

(k) selecting a second quantization coefficient substring from the quantization coefficient substrings of the first quantization coefficient string, and attaching the at least one un-encoded quantization coefficient to the second quantization coefficient substring to generate an intermediate quantization coefficient substring; and
(l) encoding the intermediate quantization coefficient substring to a second RLC substring;
wherein quantity of quantization coefficients of the intermediate quantization coefficient substring is larger than that of quantization coefficients of each quantization coefficient substring.

13. The method of claim 8, wherein Step (b) comprises:
(m) selecting a first quantization coefficient substring from quantization coefficient substrings of the first quantization coefficient string to simultaneously run-length code the quantization coefficients of the first quantization coefficient for image coding, so as to generate a first RLC substring corresponding to the first quantization coefficient substring;
(n) when the first RLC substring is generated, and the first RLC substring still comprises at least one un-encoded quantization coefficient, selecting a second quantization coefficient substring from the quantization coefficient substrings of the first quantization coefficient string, and directly attaching the at least one un-encoded quantization coefficient to the second quantization coefficient substring to generate an intermediate quantization coefficient substring; and
(o) encoding the intermediate quantization coefficient substring to a second RLC string;
wherein quantity of the quantization coefficients of the intermediate quantization coefficient substring is larger than that of quantization coefficients of each of the quantization coefficient substrings.

14. An image coding apparatus for run-length coding (RLC), the apparatus comprising:
a quantization module that quantizes a coefficient string representing a plurality of pixels to generate a first quantization coefficient string;
a coefficient memory that temporarily stores the first quantization coefficient string;
an image block information register that temporarily stores a cutoff quantization coefficient; and
an RLC engine that discards a part of the quantization coefficients of the first quantization coefficient string according to the cutoff quantization coefficient to form a second quantization coefficient string, and run-length coding the second quantization coefficient string.

15. The image coding apparatus of claim 14, wherein
the second quantization coefficient string comprises a plurality of quantization coefficient substrings each comprising a plurality of quantization coefficient;
the RLC engine comprises:
a scanning counter that calculates quantity of quantization coefficients read by the RLC engine via the first quantization coefficient string; and
an RLC unit that simultaneously run-length codes the plurality of quantization coefficients of each of the plurality of quantization coefficient substrings for image coding to generate an RLC substring corresponding to each quantization coefficient substrings; and
the plurality of RLC substrings corresponding to the plurality of quantization coefficient substrings are generated to form an RLC string.

16. The image coding apparatus of claim 15, wherein each of the RLC substrings comprises at least one coding coefficient.

17. The image coding apparatus as of claim 15, further comprising:
a buffer memory that temporarily stores at least one un-encoded quantization coefficient when the RLC unit generates an RLC substring corresponding to a quantization coefficient substring, and the quantization coefficient substring still comprises the at least one un-encoded quantization coefficient;
wherein, when before the RLC unit encodes a next quantization coefficient substring to a corresponding RLC substring, the at least one un-encoded quantization coefficient is advance read by the buffer memory and is attached to the next quantization coefficient substring before a plurality of quantization coefficients of the next quantization coefficient substring to generate an intermediate quantization coefficient substring, which is encoded into a corresponding RLC substring; and
a quantity of quantization coefficients of the intermediate quantization substring is larger than that quantization coefficients of each quantization coefficient substring.

18. The image coding apparatus of claim 15, wherein, when the RLC unit generates an RLC substring corresponding to a quantization coefficient substring, and the quantization coefficient substring still comprises at least one un-encoded quantization coefficient, the RLC unit directly attach the at least one un-encoded quantization coefficient to a next quantization coefficient substring ahead of quantization coefficients of the next quantization coefficient substring to generate an intermediate quantization coefficient substring, which is encoded into a corresponding RLC substring; and
a quantity of quantization coefficients of the intermediate quantization coefficient substring is larger than that of quantization coefficients of each quantization coefficient substring.

19. The image coding apparatus of claim 14, wherein the cutoff quantization coefficient is defined according to a software setting of the image block information register.

20. The image coding apparatus of claim 19, wherein the cutoff quantization coefficient is determined according to the software setting, a part of coefficients of the coefficient string is discarded according to the cutoff quantization coefficient, and the quantization module quantizes the coefficients that are not discarded.

* * * * *